(12) United States Patent
Werner

(10) Patent No.: US 11,975,480 B2
(45) Date of Patent: May 7, 2024

(54) APPARATUS FOR ADDITIVELY MANUFACTURING THREE-DIMENSIONAL OBJECTS

(71) Applicant: CONCEPT LASER GMBH, Lichtenfels (DE)

(72) Inventor: Jürgen Werner, Lichtenfels (DE)

(73) Assignee: Concept Laser GmbH, Lichtenfels (DE)

(*) Notice: Subject to any disclaimer, the term of this patent is extended or adjusted under 35 U.S.C. 154(b) by 1234 days.

(21) Appl. No.: 16/281,609

(22) Filed: Feb. 21, 2019

(65) Prior Publication Data

US 2020/0031050 A1 Jan. 30, 2020

(30) Foreign Application Priority Data

Jul. 25, 2018 (EP) .................................... 18185591

(51) Int. Cl.
| | |
|---|---|
| *B29C 64/153* | (2017.01) |
| *B22F 10/28* | (2021.01) |
| *B22F 10/322* | (2021.01) |
| *B22F 12/44* | (2021.01) |
| *B22F 12/45* | (2021.01) |
| *B22F 12/70* | (2021.01) |
| *B23K 26/064* | (2014.01) |
| *B23K 26/082* | (2014.01) |
| *B23K 26/14* | (2014.01) |

(Continued)

(52) U.S. Cl.
CPC ............ *B29C 64/153* (2017.08); *B22F 10/28* (2021.01); *B22F 10/322* (2021.01); *B22F 12/44* (2021.01); *B22F 12/45* (2021.01); *B22F 12/70* (2021.01); *B23K 26/064* (2015.10); *B23K 26/082* (2015.10); *B23K 26/14* (2013.01); *B23K 26/342* (2015.10); *B28B 1/001* (2013.01); *B29C 64/268* (2017.08); *B29C 64/371* (2017.08); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 8,562,897 | B2 | 10/2013 | Abe et al. |
| 9,073,264 | B2 | 7/2015 | Abe et al. |

(Continued)

FOREIGN PATENT DOCUMENTS

| | | |
|---|---|---|
| DE | 102014000022 A1 | 7/2015 |
| DE | 102015010387 A1 | 2/2017 |

*Primary Examiner* — Timothy Kennedy
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy beam (6, 6') generated via an irradiation device (4), wherein the irradiation device (4) comprises at least one beam guiding unit (7, 7') that is adapted to guide the energy beam (6, 6') across a build plane (9) in which build material (3) is applied to be irradiated, wherein the at least one beam guiding unit (7, 7') is arranged behind a point of impact (20) of the energy beam (6, 6') in the build plane (9), in particular all possible points of impact (20), with respect to a streaming direction (16) of the gas stream (13) streaming over the build plane (9).

18 Claims, 2 Drawing Sheets

(51) Int. Cl.
 *B23K 26/342* (2014.01)
 *B28B 1/00* (2006.01)
 *B29C 64/268* (2017.01)
 *B29C 64/371* (2017.01)
 *B33Y 30/00* (2015.01)
 *B33Y 40/00* (2020.01)
 *B33Y 50/02* (2015.01)

(56) References Cited

U.S. PATENT DOCUMENTS

| | | | |
|---|---|---|---|
| 9,956,612 | B1 | 5/2018 | Redding et al. |
| 10,493,562 | B2 | 12/2019 | Dimter et al. |
| 10,946,446 | B2 | 3/2021 | Domrose et al. |
| 2016/0114432 | A1* | 4/2016 | Ferrar .................. B29C 64/393 219/76.12 |
| 2016/0136731 | A1* | 5/2016 | McMurtry ............ B29C 64/153 419/53 |

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 185 591.7 filed Jul. 25, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy beam that is generated via an irradiation device, wherein the irradiation device comprises at least one beam guiding unit that is adapted to guide the energy beam across a build plane in which build material is applied to be irradiated.

Apparatuses for additively manufacturing three-dimensional objects, e.g. via selective irradiation of applied layers of build material, are generally known from prior art. Usually, an irradiation device is provided that is adapted to generate an energy beam and guide the energy beam via at least one beam guiding unit onto a build plane in which the current layer of build material is applied to be irradiated.

Further, it is known from prior art that the irradiation of the build material generates residues, such as soot, smoke or smolder, which residues can be transported out of the process chamber, i.e. the chamber in which the additive manufacturing process is performed, via a gas stream that is generated via a stream generating unit, for instance. As the residues the gas stream can be charged with, are conveyed through the process chamber it is still possible that the energy beam is incident in a region of the build plane over which residues are present, e.g. a region over which a "cloud" of residues is currently positioned. Due to the interaction of the energy beam with residues, for example scattering of at least one part of the energy beam at smoke particles or other types of residues, the quality of the additive manufacturing process, in particular the quality of the irradiation process, can be negatively influenced.

It is an object of the present invention to provide an apparatus for additively manufacturing three-dimensional objects, wherein the irradiation of build material is improved, in particular the interaction of the energy beam with residues present in the process chamber is reduced.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are, as described before, a process chamber, an irradiation device which is adapted to selectively irradiate a build material layer disposed in the process chamber with at least one energy beam, and a stream generating unit which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the at least one beam guiding unit is arranged behind a point of impact of the energy beam in the build plane, in particular all possible points of impact, with respect to a streaming direction of the gas stream streaming over the build plane. Thus, the streaming direction of the gas stream that streams over the build plane of the inventive apparatus defines the arrangement of the at least one beam guiding unit, wherein the beam guiding unit may advantageously be arranged in that residues that are generated in the additive manufacturing process, e.g. in an irradiation step of the additive manufacturing process, are transported or conveyed over the build plane via the gas stream in that the energy beam does not interact with the residues that are conveyed via the gas stream.

Hence, it is possible to take the streaming direction of the gas stream into calculation, wherein the gas stream, in particular the streaming direction of the gas stream, defines the direction or the path along which the residues that are generated in the additive manufacturing process are conveyed over the build plane and transported out of the process chamber. Hence, it is possible to determine the streaming path of the residues that are generated, e.g. due to the irradiation of build material. As the streaming path or the streaming pattern of the residues is determined, it is possible to irradiate build material in regions of the build plane only, in which the residues are not (currently) present.

The beam guiding unit is arranged in that the energy beam being is incident on the build plane "behind" the residues that are generated via the energy beam, wherein the term "behind" is defined with respect to the movement direction of the residues, i.e. the streaming direction of the gas stream. The term behind may be understood as upstream with respect to the streaming direction of the gas stream. Hence, the beam guiding unit may be arranged (perpendicular) above the build plane behind the points of impact.

According to the inventive apparatus, the beam guiding unit is arranged behind a point of impact of the energy beam in the build plane, in particular all possible points of impact, with respect to the streaming direction of the gas stream streaming over the build plane. In typical additive manufacturing apparatuses, as known from prior art, the beam guiding unit is usually arranged over the build plane, in particular over a center of the build plane. In this prior art arrangement the energy beam is likely to interact with residues that are generated due to the irradiation of build material with the energy beam, as build material that is irradiated "against" streaming direction of the gas stream (with respect to the arrangement of the beam guiding unit) generates residues that are transported via the gas stream towards the part of the build plane over which the beam guiding unit is arranged. Thus, in such a region of the build plane the energy beam may interact with the residues that have been generated due to the irradiation of build material with the energy beam.

Therefore, the beam guiding unit is arranged behind ("upstream" to) the point of impact of the energy beam with respect to the streaming direction of the gas stream. Advantageously, this arrangement allows for irradiating build material, wherein the residues that are generated due to the irradiation of the build material are transported/conveyed via the gas stream, wherein the point of impact of the energy beam is "behind" the residues that are generated and transported via the gas stream. Due to the arrangement of the beam guiding unit "behind a point of impact" of the energy beam it is possible that the energy beam is incident on the build plane without passing a volume inside the process chamber in which the residues that are generated due to the irradiation of build material are present. In other words, it is possible to guide the energy beam onto the build plane without interacting with the residues that are generated in the irradiation process with the same energy beam.

It is particularly preferred that the beam guiding unit may be arranged in the inventive apparatus in that the beam guiding unit is arranged behind all possible points of impact of the energy beam in the build plane. For example, the beam guiding unit may be arranged above an edge of the build plane ("outside the build plane"), wherein the energy beam being guided onto the build plane will have a point of impact that is arranged before ("downstream" to) the position of the beam guiding unit with respect to the streaming direction of the gas stream. Thus, the energy beam can be guided via the beam guiding unit in that the point of impact is "behind" the residues that are generated via the energy beam. Therefore, an interaction of the energy beam with residues generated in the additive manufacturing process is reduced or entirely avoided.

The inventive apparatus may further be improved in that the at least one beam guiding unit may be arranged over at least one part of the build plane or a process plane comprising the build plane dependent on the streaming direction of the gas stream. As described before, the streaming direction of the gas stream may be taken into calculation as one of multiple possible parameters of the gas stream that is generated in the additive manufacturing process, e.g. inside the process chamber, to remove residues that are generated in the additive manufacturing process. By taking the streaming direction of the gas stream into calculation it is possible to determine the movement pattern or the movement path along which the residues will be moved through the process chamber and out of the process chamber. Thus, it is possible to predict the positions of the residues that are generated via the energy beam and therefore, avoid the energy beam being incident on such residues/interact with such residues.

Preferably, the beam guiding unit is arranged on a side of the build plane (or over a region on the side of the build plane) facing against streaming direction. Thus, the residues that are generated by guiding the energy beam onto the build plane will be moved in streaming direction and therefore, allow for the energy beam to be guided "behind" the residues. According to this embodiment the at least one beam guiding unit may be arranged over a part of the build plane or a part of the process plane facing a side of the process chamber on which the gas stream is fed into the process chamber or is streamed over the build plane. In other words, at least two sides of the build plane may be defined, wherein the gas stream is streamed over the build plane starting from the side that "faces against streaming direction", i.e. the side of the build plane that faces the side of the process chamber from which the gas stream is fed into the process chamber. Consequently, the other side of the build plane faces in streaming direction, i.e. faces the side of the process chamber on which the gas stream is removed from the process chamber. The sides "facing against/in streaming direction" may also be deemed as intake side and outlet side or gas intake and gas outlet, respectively.

The beam guiding unit being arranged over a part of the build plane may also be understood as the entire available build plane being separated into several parts, wherein at least one beam guiding unit may be assigned to each part of the build plane. For example, it is possible to have multiple parts of the build plane, wherein each part of the build plane is irradiated with a separate energy beam guided via a beam guiding unit.

Further, the at least one beam guiding unit may be arranged eccentric with respect to the center of at least one part of the build plane the at least one beam guiding unit is assigned to. Thus, deviant from additive manufacturing apparatuses known from prior art, the beam guiding unit does not have to be arranged above the center of the build plane or the respective part of the build plane the beam guiding unit is assigned to, but it is possible to arrange the beam guiding unit eccentric to the respective center of the part of the build plane the beam guiding unit is assigned to. As described before, it is advantageous to arrange the beam guiding unit over a region of the part of the build plane the beam guiding unit is assigned to that faces the side of the process chamber on which the gas stream is fed into the process chamber, i.e. the side of the part of the build plane facing the gas intake.

According to another preferred embodiment of the inventive apparatus, the irradiation device may be adapted to guide the energy beam across the build plane, wherein the energy beam is incident on the build plane from a side of the process chamber in which the gas streams over the build plane with respect to the center of the part of the build plane that is to be irradiated. Hence, a beam guiding unit that may be deemed as a functional component of the irradiation device, as described before, may be arranged in that the energy beam that is guided via a beam guiding element of the beam guiding unit, for example a movable mirror, is guided from a side of the process chamber from which the gas stream streams to the other side of the process chamber with respect to the center of the part of the build plane the beam guiding unit is assigned to. As described before, a gas intake and a gas outlet may be arranged on two different sides of the process chamber, wherein the beam guiding unit that is used to guide the energy beam across the build plane is arranged on the side of the process chamber facing the gas intake. Hence, the beam guiding unit is not arranged centric over the part of the build plane the beam guiding unit is assigned to, but the beam guiding unit is arranged over a part of the build plane facing the gas intake.

The inventive apparatus may further be improved in that the at least one beam guiding unit may be adapted to adjust an angle of incidence under which the energy beam is incident on the build plane dependent on at least one parameter of the gas stream, preferably a streaming direction and/or a streaming velocity of the gas stream. Therefore, it is possible to adjust the angle of incidence of the energy beam on the build plane dependent on the streaming direction and/or the streaming velocity of the gas stream. Hence, it is possible to take the generation of residues (and their current position) into calculation and adjust the angle of incidence under which the energy beam is incident on the part of the build plane the at least one beam guiding unit is assigned to.

According to another embodiment of the inventive apparatus, the irradiation device, in particular the at least one beam guiding unit, may be adapted to adjust the angle of incidence in that a beam guiding path the energy beam is guided along only extends through first regions of the process chamber, in particular above the build plane, wherein residues generated due to the irradiation of build material are only generated in second regions which differ from the first regions. Thus, the energy beam may be guided along the beam guiding path, e.g. from a beam source, such as a laser beam source, through the optical train onto the build plane. The energy beam being guided along the beam guiding path only passes first regions of the process chamber, wherein residues are only generated/present in second regions of the process chamber. In other words, the energy beam is guided along the beam guiding path, wherein the first regions through which the beam guiding path extends or through which the energy beam is guided, are free of residues that are generated due to the irradiation of build material, as the residues are moved through second regions of the process chamber.

Of course, the first regions and the second regions are not fixed in position and may differ dependent on the angle of incidence that is adjusted and the position of the residues that are transported or conveyed, respectively, via the gas stream.

Further, the irradiation device, in particular the at least one beam guiding unit, may be adapted to guide the energy beam across the build plane behind residues loaded in the gas stream with respect to the streaming direction of the gas stream, which residues are generated in the irradiation process of build material using the energy beam. In other words, the residues that are generated in the irradiation process are conveyed via the gas stream, i.e. the gas stream is loaded with the residues that are generated in the irradiation process. By guiding the energy beam behind the residues that are generated and moved via the gas stream, the energy beam can be guided through the process chamber without interacting with the residues that are generated due to the irradiation of build material. The beam guiding unit may therefore, be adapted to take the position and the movement path of the generated residues into calculation, in particular considering the streaming direction and/or the streaming velocity of the gas stream. Hence, it is possible to avoid the energy beam interacting with the generated residues and therefore, improve the irradiation process.

The inventive apparatus may further be improved in that at least two beam guiding units can be provided, wherein at least one first part of the build plane may be assigned to a first beam guiding unit and at least one second part of the build plane may be assigned to a second beam guiding unit. According to this embodiment, it is possible to subdivide the available build plane into at least two parts, namely a first part of the build plane and a second part of the build plane. Of course, the available build plane may be divided into an arbitrary number of parts, wherein a corresponding number of beam guiding units can be used to irradiate build material arranged or applied in the respective parts of the build plane. Each of the at least two beam guiding units may be arranged dependent on the at least one parameter of the gas stream that streams over the corresponding part of the build plane, in particular dependent on the streaming direction of the gas stream, as described before. Advantageously, the at least two beam guiding units are arranged in that residues generated via the irradiation of build material performed by the energy beam that is guided via the first beam guiding unit do not interfere with the irradiation process performed via the second energy beam guided via the second beam guiding unit and vice versa.

For example, it is possible that the at least two beam guiding units are arranged in series or in parallel with respect to the streaming direction of the gas stream. Thus, it is possible that the build plane is divided into the at least two parts being arranged in series or in parallel with respect to the streaming direction of the gas stream. Of course, by subdividing the available build plane in multiple parts, it is also possible to combine the arrangement of different parts being arranged in series and/or in parallel with respect to the streaming direction of the gas stream. The arrangement of the at least two beam guiding units assigned to corresponding parts of the build plane allows for the irradiation of build material being arranged in a larger available build plane allowing for the irradiation of larger parts and/or multiple parts that are build simultaneously. Further, by using more than one beam guiding unit, it is possible to arrange each beam guiding unit in that the corresponding part of the build plane the beam guiding unit is assigned to can be irradiated without interfering with the residues that are generated in the irradiation process(es).

The at least one beam guiding unit (or at least one of the beam guiding units) may be movable relative to the build plane, wherein the apparatus, in particular the irradiation device, may be adapted to move the at least one beam guiding unit to at least one part of the build plane that is to be irradiated, wherein the apparatus is adapted to position the beam guiding unit eccentric with respect to the center of the part of the build plane. According to this embodiment, it is possible to move the at least one beam guiding unit relative to the build plane, wherein the build plane may, for example, be subdivided into multiple parts. Thus it is possible to irradiate build material applied in the available build plane via one beam guiding unit that is movable to different positions from which different parts of the build plane can be irradiated. For example, the available build plane may be subdivided into two parts, wherein a first position and a second position can be defined from which the two parts of the build plane (build material applied in those two parts) can be irradiated. Thus, it is possible to move the beam guiding unit to a first position to irradiate build material arranged in the first part of the available build plane, wherein after the build material is irradiated, the beam guiding unit may be moved to the second position from where the build material arranged in the second part of the build plane can be irradiated.

In each of those positions, the beam guiding unit may be arranged eccentric with respect to the center of the corresponding part of the build plane that is to be irradiated in the corresponding irradiation step, in particular outside that part of the build plane, i.e. arranged over a region outside the corresponding part of the build plane. Thus, the gas stream that streams over the build plane and therefore, over the corresponding part of the build plane that is to be irradiated, can be taken into calculation regarding the position of the arrangement of the beam guiding unit. Therefore, the beam guiding unit may be arranged relative to the corresponding part of the build plane that is to be irradiated taking into calculation the streaming direction and/or the streaming velocity of the gas stream to ensure that the generated residues are removed from the process chamber along a movement path, e.g. streaming path of the gas stream, wherein the energy beam is not interacting with the residues.

The inventive apparatus may further be improved in that the irradiation device or a control unit may be adapted to choose at least one beam guiding unit that is arranged behind a point of impact of the energy beam for the corresponding part of the build plane, in particular all possible points of impact, with respect to the streaming direction of the gas stream streaming over the build plane or adapted to move at least one beam guiding unit into a position in which the at least one beam guiding unit that is arranged behind a point of impact of the energy beam for the corresponding part of the build plane, in particular all possible points of impact, with respect to the streaming direction of the gas stream streaming over the build plane.

According to a first alternative of this embodiment, the irradiation device or a control unit may be adapted to choose one of at least two beam guiding units to perform an irradiation process. To choose between the at least two beam guiding units that are available, the part of the build plane that is to be irradiated is taken into calculation, wherein the beam guiding unit is chosen that is arranged behind the point of impact of the energy beam in the corresponding part of the build plane, that is to be irradiated. In other words, a beam guiding unit out of a plurality of beam guiding units can be chosen in that during the irradiation process that is performed via the beam guiding unit the condition is fulfilled that the energy beam is guided to a point of impact without interfering with residues that are generated in the irradiation process.

Hence, the respective beam guiding unit is chosen that allows for guiding the energy beam "behind" the residues (e.g. cloud of residues) that is generated via the energy beam and guided out of the process chamber via the gas stream. The beam guiding unit that is chosen to perform the irradiation process is arranged relative to the part of the build plane in that the beam guiding unit is arranged behind all possible points of impact the energy beam has to be guided to to perform the irradiation task, e.g. the energy beam is guided along a beam path arranged in the part of the build plane, wherein all possible points of impact on the beam path are arranged behind the residues that are generated due to the irradiation process.

According to a second alternative of the embodiment, the irradiation device or the control unit may be adapted to move the at least one beam guiding unit into a position in which the irradiation process for the part of the build plane is performed. In that position the beam guiding unit is arranged behind all possible points of impact and the energy beam is guided behind the residues generated in the irradiation process. In other words, the beam guiding unit is arranged behind all possible points of impact of the energy beam in the part of the build plane. Further, multiple parts of the build plane can be defined or multiple irradiation patterns that have to be generated in multiple positions of the build plane can be defined, wherein the irradiation device or the control unit is adapted to move the beam guiding unit into the corresponding positions to perform the irradiation processes. In every position the beam guiding unit is arranged behind the points of impact to which the energy beam has to be guided to irradiate or generate the respective irradiation pattern. Of course, a combination of both alternatives, i.e. choosing a suitable beam guiding unit and/or moving one or more beam guiding units, can be performed arbitrarily.

Preferably, an irradiation assembly may be provided that is movable relative to the build plane, which irradiation assembly comprises at least one beam guiding unit and at least one stream generating unit and/or at least one application unit that are arranged forming an assembly. The irradiation assembly according to this embodiment allows for providing a compact assembly that can be moved as one part over the build plane, wherein the irradiation assembly may be positioned or arranged in one position from where the irradiation process for a corresponding part of the build plane can be performed, wherein during the irradiation process the gas stream can be generated via the stream generating unit of the irradiation assembly. Preferably, an application unit is also provided with the irradiation assembly that allows for applying build material in the corresponding part of the build plane.

Besides, the invention relates to an irradiation device for an apparatus for additively manufacturing three-dimensional objects by means of successive layerwise selective irradiation and consolidation of layers of a build material which can be consolidated by means of an energy beam generated via the irradiation device, wherein the irradiation device comprises at least one beam guiding unit that is adapted to guide the energy beam across a build plane of the apparatus in which build material is applied to be irradiated, wherein the at least one beam guiding unit is arranged or arrangeable behind a point of impact of the energy beam in the build plane, in particular all possible points of impact, with respect to a streaming direction of the gas stream streaming over the build plane.

Further, the invention relates to a method for operating at least one apparatus for additively manufacturing three-dimensional objects by means of successive layerwise selective irradiation and consolidation of layers of a build material which can be consolidated by means of an energy beam generated via an irradiation device, wherein the irradiation device comprises at least one beam guiding unit that is adapted to guide the energy beam across a build plane in which build material is applied to be irradiated, wherein the at least one beam guiding unit is arranged behind a point of impact of the energy beam in the build plane, in particular all possible points of impact, with respect to a streaming direction of the gas stream streaming over the build plane.

Of course, all features, details and advantages that are described with respect to the inventive apparatus are fully transferable to the inventive irradiation device and the inventive method.

Exemplary embodiments of the invention are described with reference to the Fig. The Fig. are schematic diagrams, wherein FIG. 1 shows an inventive apparatus according to a first embodiment in side view;

Figure 1:
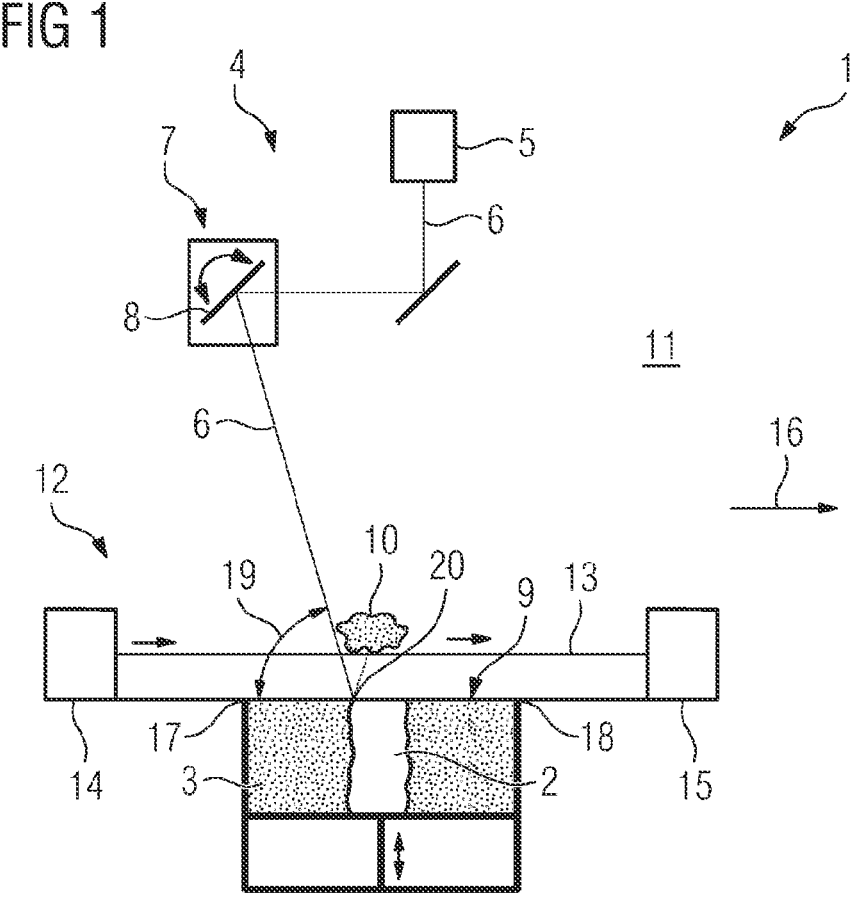

FIG. 1 shows an apparatus 1 for additively manufacturing three-dimensional objects 2 by means of successive layerwise selective irradiation and consolidation of layers of a build material 3. For consolidating the layers of build material 3 an irradiation device 4 is provided that comprises a beam source 5, for example a laser source, which beam source 5 is adapted to generate an energy beam 6, e.g. a laser beam. The irradiation device 4 further comprises a beam guiding unit 7 with a movable beam guiding element 8, for example a mirror element.

The irradiation device 4 is therefore, adapted to generate and guide the energy beam 6 across an available build plane 9 in which the build material 3 is layerwise applied. Due to the irradiation of build material 3 in the build plane 9 residues 10 are generated, such as soot, smoke or smolder. To remove the residues 10 from a process chamber 11, in which the additive manufacturing process is performed, the apparatus 1 comprises a stream generating unit 12 that is adapted to generate a gas stream 13 that streams over the build plane 9. The stream generating unit 12 comprises a gas intake 14 and a gas outlet 15 between which the gas stream 13 is generated. Thus, a streaming direction 16 can be defined along which the gas stream 13 streams through the process chamber 11.

The gas stream 13 can be charged with the residues 10, wherein the residues 10 can be conveyed or moved out of the process chamber 11 via the gas stream 13 that is streaming between the gas intake 14 and the gas outlet 15. The build plane 9 therefore, comprises a first side 17 facing the gas intake 14 and therefore, facing against streaming direction 16 and a second side 18 facing the gas outlet 15 and therefore, facing in streaming direction 16.

The beam guiding unit 7 according to the embodiment of the inventive apparatus 1 that is depicted in FIG. 1, is arranged eccentric with respect to the build plane 9. In particular, the beam guiding unit 7 is arranged "outside" the build plane 9, on the side 17 of the build plane 9 facing against streaming direction 16. The beam guiding unit 7 is arranged behind a point of impact (20) of the energy beam (6, 6') in the build plane (9), in particular all possible points of impact (20), with respect to a streaming direction (16) of the gas stream (13) streaming over the build plane (9). Therefore, it is possible that the irradiation device 4, in particular the beam guiding unit 7, is adapted to adjust an angle of incidence 19 under which the energy beam 6 is incident on the build plane 9 in that a point of impact 20 of the energy beam 6 in the build plane 9 is arranged behind ("upstream" to) the residues 10 that are generated due to the irradiation of build material 3 via the energy beam 6 with respect to the streaming direction 16.

Further, the beam guiding unit 7 is arranged behind the point of impact 20 with respect to the streaming direction 16 and the center of the build plane 9 (not shown). Thus, the energy beam 6 being guided along a beam guiding path does not pass regions of the process chamber 11 in which residues 10 (that are generated due to the irradiation of build material 3) are present. Instead, the energy beam 6 is only guided through first regions of the process chamber 11 that are free of residues 10, wherein the residues 10 are only generated or moved through second regions inside the process chamber 11. Of course, the position of the first regions and the second regions vary during the additive manufacturing process, in particular during the irradiation of build material 3, as the energy beam 6 is guided to different positions in the build plane 9 and the residues 10 are moved through and outside the process chamber 11 via the gas stream 13 streaming with a defined streaming velocity along the streaming direction 16.

Figure 2:
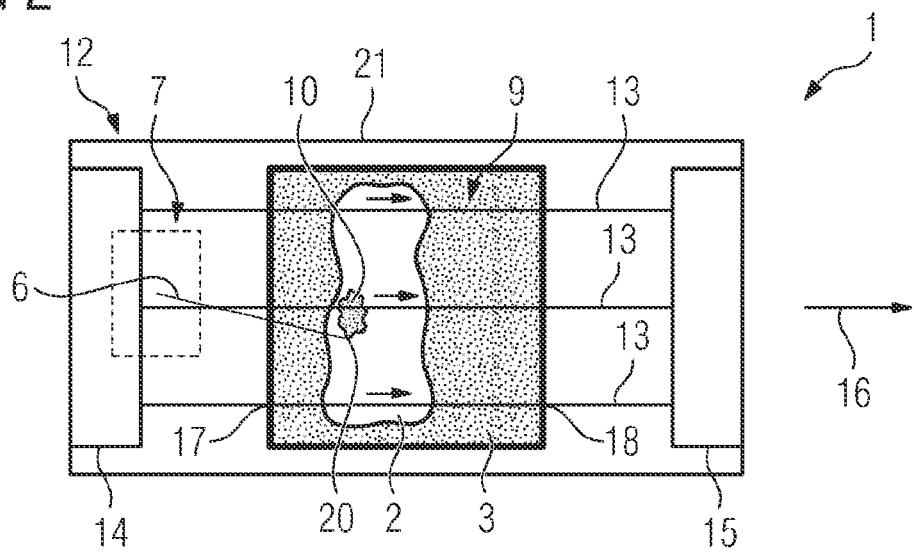
FIG. 2 shows the apparatus of FIG. 1 in top view.

FIG. 2 shows the apparatus 1 of FIG. 1 in top view, wherein the dashed line depicts the beam guiding unit 7 that is arranged above a process plane 21 comprising the build plane 9, wherein, as described before, the beam guiding unit 7 is arranged above the build plane 9/the process plane 21. Hence, the energy beam 6 may be guided via the beam guiding unit 7, in particular via the movable beam guiding element 8 across the build plane 9 to selectively irradiate the build material 3 applied in the build plane 9. Thus, the corresponding cross-section of the object 2 can be consolidated via the energy beam 6. In each point of the build plane 9, e.g. each point of impact 20, residues 10 are generated due to the irradiation of build material 3 via the energy beam 6. As described before, the residues 10 are moved via the gas stream 13 that can be loaded with the residues 10 to move the residues out of the process chamber 11, as the gas stream 13 is streamed via the stream generating unit 12 from the gas inlet 14 to the gas outlet 15.

The build plane 9, as already described before, extends between the two sides 17, 18, namely the side 17 facing the gas inlet 14 and the side 18 facing the gas outlet 15. The beam guiding unit 7 is adapted to guide the energy beam 6 in that the energy beam 6 is incident on the build plane 9 "behind the residues 10". Hence, the energy beam 6 can be guided onto the build plane 9 in that the points of impact 20 are arranged behind the residues 10 with respect to the streaming direction 16. Thus, the energy beam 6 that does not pass the regions in the process chamber 11 in which the residues 10 are present. The irradiation device 4 is therefore, adapted to guide the energy beam 6 across the build plane 9 in that the points of impact 20 are always "behind" the residues 10 that are moved along streaming direction 16 towards the gas outlet 15. Due to the arrangement of the beam guiding unit 7, every point and region of the build plane 9 can be reached with the energy beam 6 without interfering with the residues 10 that are generated due to the irradiation of the same region or point.

For guiding the energy beam 6 across the build plane 9, different parameters of the gas stream 13 can be taken into calculation, such as the streaming direction 16 and the streaming velocity of the gas stream 13, for instance.

Figure 3:
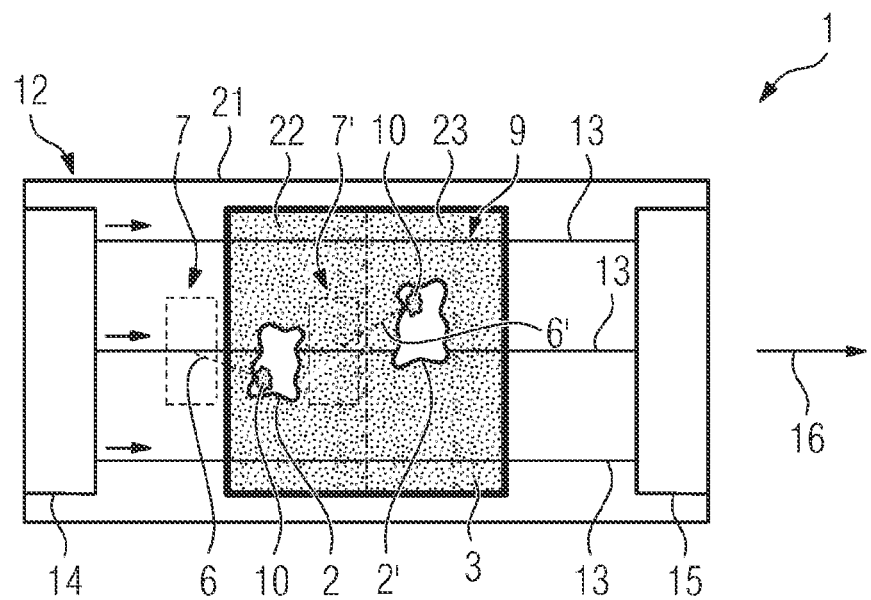
FIG. 3 shows an inventive apparatus according to a second embodiment in top view.

FIG. 3 shows an inventive apparatus 1 according to a second embodiment, wherein the same numerals are used for the same parts. The apparatus 1 that is depicted in FIG. 3 also comprises a stream generating unit 12 with a gas inlet 14 and a gas outlet 15, wherein the stream generating unit 12 generates a gas stream 13 streaming between the gas inlet 14 and the gas outlet 15. The gas stream 13 again streams over the build plane 9 that is comprised in a process plane 21. The apparatus 1 depicted in FIG. 3 comprises two beam guiding units 7, 7' that are arranged above the process plane 21 (depicted via dashed lines).

The build plane 9 according to the second embodiment is subdivided into two parts 22, 23, wherein the first beam guiding unit 7 is assigned to irradiate the first part 22 of the build plane 9, wherein the second beam guiding unit 7' is assigned to irradiate the second part 23 of the build plane 9. As can further be derived from FIG. 3, the first beam guiding unit 7 is arranged in that an angle of incidence 19 (FIG. 1) can be adjusted in that the energy beam 6 is guided onto the first part 22 of the build plane 9 behind residues 10 generated due to the irradiation of build material 3. Analogously, the second beam guiding unit 7' is arranged eccentric to the second part 23 of the build plane 9, wherein a second energy beam 6' can be guided onto the second part 23 in that the point of impact 20 (cf. FIG. 1) is behind the residues 10 generated in the additive irradiation process.

Due to the subdivision of the build plane 9 into the first part 22 and the second part 23, the parts 22, 23 can be assigned to the beam guiding unit 7, 7'. Thus, it is possible to build two objects 2, 2' (or one large object) subdivided into irradiation processes performed using the at least two beam guiding units 7, 7'. While performing the irradiation processes it is beneficial to irradiate build material via the first beam guiding unit 7 in regions in which the second beam guiding unit 7' does not irradiate build material 3 to ensure that the residues 10 that are generated via the irradiation of build material 3 with the energy beam 6 does not generate residues 10 that are streamed via the gas stream 13 into regions in which the second energy beam 6' is used to irradiate build material 3.

Of course, the arrangement that is depicted in FIG. 3 is merely exemplary, wherein it is also possible to have multiple beam guiding units 7, 7' being arranged in parallel and/or in series.

Figure 4:
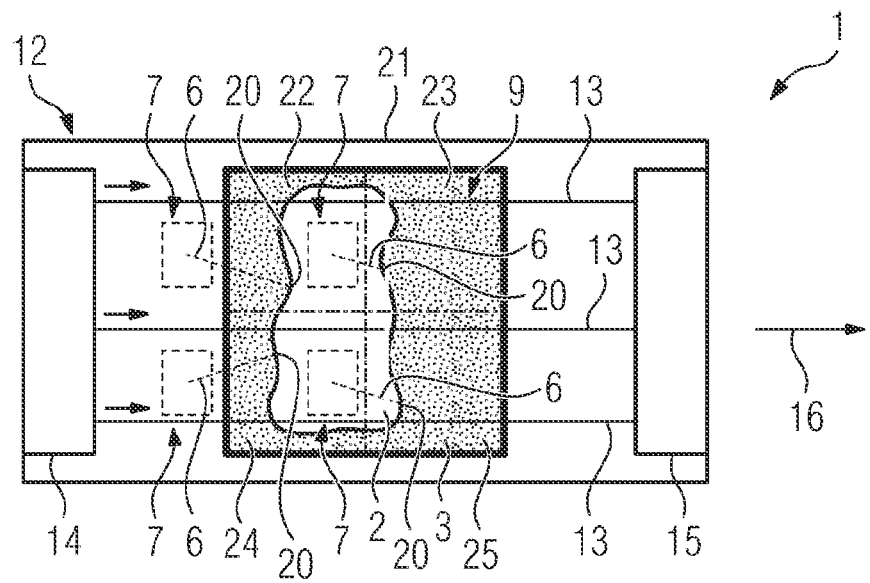
FIG. 4 shows an inventive apparatus according to a third embodiment in top view.

FIG. 4 shows an inventive apparatus 1 according to a third embodiment. According to the third embodiment, the build plane 9 is subdivided into four parts 22-25. In the exemplary embodiment that is depicted in FIG. 4, one large object 2 is to be irradiated, wherein it is also possible that multiple smaller objects 2 can be irradiated in the parts 22-25 of the build plane 9. For performing the irradiation processes the apparatus 1 that is depicted in FIG. 4 comprises a beam guiding unit 7 that is movable relative to the build plane 9, wherein four exemplary positions of the beam guiding unit 7 are depicted as dashed rectangles. Although the stream generating unit 12 is depicted as separate unit, it is also possible to integrate the stream generating unit 12 into the beam guiding unit 7, wherein the beam guiding unit 7 and the stream generating unit 12 may form and irradiation assembly that can be moved relative to the build plane 9. It is also possible to further include an application unit in the irradiation assembly (not shown) to apply build material in the parts 22-25 of the build plane 9.

The irradiation device 4 according to the third embodiment that is depicted in FIG. 4, is adapted to control the movement of the beam guiding unit 7 relative to the build plane 9 in that the beam guiding unit 7 can be arranged, as described before, in that the point of impact 20 of the energy beam 6 is arranged behind the residues 10 that are generated in the irradiation process. Thus, the energy beam 7 can be arranged behind the points of impact 20 with respect to the streaming direction 16 of the gas stream 13. After the irradiation process in one of the parts 22-25 is finished, the irradiation device 4 may move the beam guiding unit 7 to the next position, as depicted via the dashed rectangles, to perform the irradiation process in the next part 22-25 of the build plane 9. Of course, it is possible to arrange multiple parts 22-25 of the build plane 9 in parallel or in a series, wherein the sequence in which the individual parts 22-25 of the build plane 9 are irradiated via the beam guiding unit 7, in particular via the energy beam 6, can be chosen arbitrarily.

Hence, the inventive apparatus 1 allows for guiding the energy beam 6 across the build plane 9, wherein a point of impact 20 of the energy beam 6 lies behind the residues 10 that are generated due to the irradiation of build material 3 via the energy beam 6. This is achieved by arranging the beam guiding unit 7 behind the point of impact 20 with respect to the streaming direction 16 of the gas stream 13 that is used to remove the residues 10 from the process chamber 11. Thus, the irradiation device 4 is adapted to adjust the angle of incidence 19 in that the energy beam 6 is only guided through regions of the process chamber 11 that are free of residues 10 and residues 10 are only generated and guided in regions of the process chamber 11 that differ from the regions through which the energy beam 6 is guided. Therefore, it is possible to avoid an interaction of the energy beam 6 with the residues 10 and therefore, it is possible to reduce negative effects of the residues 10 on the irradiation process.

Of course, the inventive method can be performed on the inventive apparatus 1, preferably using an inventive irradiation device 4. Self-evidently, all features, details and advantages described with respect to the individual embodiments can arbitrarily be combined and interchanged.

The invention claimed is:

1. An apparatus for additively manufacturing three-dimensional objects by successive layerwise selective irradiation and consolidation of layers of a build material, the apparatus comprising:
an irradiation device adapted to generate an energy beam, the irradiation device comprising one or more beam guiding units adapted to guide the energy beam across a build plane for the selective irradiation of the build material; and
a stream generating unit adapted to generate a gas stream;
wherein the one or more beam guiding units includes a first beam guiding unit and a second beam guiding unit, the first beam guiding unit is arranged entirely behind the build plane, and the second beam guiding unit is arranged over at least one part of the build plane or over at least one part of a process plane comprising the build plane dependent on the streaming direction of the gas stream.

2. The apparatus according to claim 1, wherein the second beam guiding unit is arranged over the at least one part of the build plane or over the at least one part of the process plane that faces a side of a process chamber from which the gas stream enters the process chamber or from which the gas stream streams over the build plane.

3. The apparatus according to claim 1, wherein at least one beam guiding unit of the one or more beam guiding units is arranged eccentric with respect to a center of at least one part of the build plane the at least one beam guiding unit is to irradiate.

4. The apparatus according to claim 1, wherein the energy beam is incident on the build plane from a side of a process chamber from which the gas stream streams over the build plane with respect to a center of a part of the build plane to be irradiated.

5. The apparatus according to claim 1, wherein at least one beam guiding unit of the one or more beam guiding units of the irradiation device is adapted to adjust an angle of incidence under which the energy beam is incident on the build plane dependent on at least one parameter of the gas stream.

6. The apparatus according to claim 5, wherein the at least one parameter of the gas stream is a streaming direction and/or a streaming velocity.

7. The apparatus according to claim 1, wherein at least one beam guiding unit of the one or more beam guiding units of the irradiation device is adapted to adjust an angle of incidence of the energy beam being guided along a beam guiding path that only extends through first regions of the build plane, wherein residues generated by the irradiation of the build material are only moved toward second regions of the build plane which differ from the first regions.

8. The apparatus according to claim 1, wherein at least one first part of the build plane is irradiated via the first beam guiding unit and at least one second part of the build plane is irradiated via the second beam guiding unit.

9. The apparatus according to claim 8, wherein the first and second beam guiding units are arranged in series or in parallel with respect to the streaming direction of the gas stream.

10. The apparatus according to claim 8, wherein the at least one first part of the build plane is irradiated via the first beam guiding unit prior to the at least one second part of the build plane being irradiated via the second beam guiding unit.

11. The apparatus according to claim 8, wherein the at least one first part of the build plane is irradiated via the first beam guiding unit while the at least one second part of the build plane is being irradiated via the second beam guiding unit.

12. The apparatus according to claim 1, wherein at least one beam guiding unit of the one or more beam guiding units is moveable relative to the build plane, wherein the irradiation device is adapted to move the at least one beam guiding unit to at least one part of the build plane to position the at least one beam guiding unit eccentric with respect to a center of the at least one part of the build plane to be irradiated.

13. The apparatus according to claim 1, wherein the irradiation device or a control unit is adapted to choose at least one beam guiding unit of the one or more beam guiding units arranged behind a point of impact of the energy beam on the build plane with respect to the streaming direction of the gas steam streaming over the build plane for build material irradiation.

14. The apparatus according to claim 1, wherein the irradiation device or a control unit is adapted to move at least one beam guiding unit of the one or more beam guiding units into a position in which the at least one beam guiding unit is arranged behind a point of impact of the energy beam on the build plane with respect to the streaming direction of the gas stream streaming over the build plane.

15. The apparatus according to claim 1, wherein at least one beam guiding unit of the one or more beam guiding units is moveable relative to the build plane.

16. The apparatus according to claim 1, wherein the stream generating unit comprises a gas intake and a gas outlet between which the gas stream is generated.

17. The apparatus according to claim 16, wherein residues generated by the irradiation of the build material are removed from the build plane of a process chamber via the gas outlet.

18. An irradiation device for an apparatus for additively manufacturing three-dimensional objects by successive layerwise selective irradiation and consolidation of layers of a build material, the irradiation device comprising:
an energy beam generated via the irradiation device;
at least one beam guiding unit adapted to guide the energy beam over a build plane of the apparatus in which build material is applied for the selective irradiation; and
a stream generating unit adapted to generate a gas stream;
wherein the one or more beam guiding units includes a first beam guiding unit and a second beam guiding unit, the first beam guiding unit is arranged entirely behind the build plane, and the second beam guiding unit is arranged over at least one part of the build plane or over at least one part of a process plane comprising the build plane dependent on the streaming direction of the gas stream.

* * * * *